United States Patent
Pai et al.

(10) Patent No.: US 7,559,087 B2
(45) Date of Patent: Jul. 7, 2009

(54) TOKEN GENERATION METHOD AND APPARATUS

(75) Inventors: Dilip K. Pai, Bellevue, WA (US);
Manish Mittal, Sammamish, WA (US);
Monte C Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 11/009,887

(22) Filed: Dec. 10, 2004

(65) Prior Publication Data

US 2006/0130131 A1     Jun. 15, 2006

(51) Int. Cl.
G06F 11/30 (2006.01)
G08B 23/00 (2006.01)
(52) U.S. Cl. .......................................... 726/25; 726/9
(58) Field of Classification Search ................ None
See application file for complete search history.

(56) References Cited

U.S. PATENT DOCUMENTS

| | | | |
|---|---|---|---|
| 5,371,883 A | 12/1994 | Gross et al. | |
| 6,587,879 B1 | 7/2003 | Reynolds | |
| 6,665,634 B2 | 12/2003 | Taft et al. | |
| 2002/0169825 A1* | 11/2002 | Hougland et al. | 709/203 |
| 2005/0044197 A1* | 2/2005 | Lai | 709/223 |
| 2005/0251853 A1* | 11/2005 | Bhargavan et al. | 726/1 |
| 2005/0268326 A1* | 12/2005 | Bhargavan et al. | 726/1 |
| 2005/0273844 A1* | 12/2005 | Dapkus et al. | 726/9 |

OTHER PUBLICATIONS

Atkinson, Bob et al. Web Services Security (WS-Security) Apr. 5, 2002. version 1. p. 1-29.*
Hallam-Baker, Phillip. Web Services Security SAML token Binding. Working Draft 04. Dec. 9, 2002. p. 1-23.*
Securing Web Services with WS-Security. Dec. 5, 2003. p. 1-20.*
Thurston, Gene et al. Web Services Security: SOAP Message Security 1.0 (WS-Security 2004). Mar. 2004. p. 1-56.*
Zhang, et al.; "Testing the Schedulability of Synchronous Traffic for the Timed Token Medium Access Control Protocol"; Real Time Systems, vol. 22. No. 3, pp. 251-280; May 2002.

* cited by examiner

Primary Examiner—Christian LaForgia
(74) Attorney, Agent, or Firm—Lee & Hayes, PLLC

(57) ABSTRACT

A system or method receives a request to generate a test token. The request identifies a token template that contains information regarding the token to be generated. The system or method identifies the information contained in the token template and generates the requested token based on the information contained in the token template. The generated token may be a defective token.

30 Claims, 4 Drawing Sheets

TOKEN GENERATION METHOD AND APPARATUS

TECHNICAL FIELD

The systems and methods described herein relate to generating tokens used for authentication in a network environment, such as XML (extensible markup language) tokens.

BACKGROUND

Services, such as Web services, in different domains or networks often need to communicate with one another. Federation is an authentication concept that allows users in one domain or network to obtain authenticated access to services in another domain or network. Certain protocols are developed around the exchange of tokens (such as XML tokens) that are distributed by an authentication server (or a login server) in a network. The tokens are consumed by corresponding federation servers as well as "partner websites" or Web services in a different domain or a different network.

When developing and testing a new web service or application, it is important to ensure that the web service or application properly handles defective tokens. Defective tokens may be generated, for example, by a malfunctioning server or by someone attempting to hack into a computer system, hack into a network, or otherwise compromise a computer system or network. A defective token may include one or more of the following: an improper structure, incorrect data, or improper signature).

In a network of web services, a token is typically acquired by contacting an authentication server and requesting a token. This approach is not well-suited to testing a new web service or application for proper handling of defective tokens because a properly functioning authentication server is not likely to generate defective tokens. In a live network environment, it may be undesirable for the authentication server to intentionally generate defective tokens for testing purposes. These defective tokens may disrupt the normal operation of the network.

Therefore, it would be desirable to provide the ability to generate arbitrary tokens, including defective tokens, to determine how web services and/or applications handle the arbitrary tokens.

SUMMARY

The systems and methods described herein relate to generating one or more tokens. The systems and methods further distribute the generated tokens and monitor the performance of web services, devices and/or applications in response to distribution of the tokens.

In a particular embodiment, a request is received to generate a test token. The request identifies a token template that contains information regarding the token to generate. The information includes, for example, the type of token, the token structure, token format, initial data, as well as the algorithm and certificate to be used for signatures. This embodiment further identifies the information contained in the token template and generates a test token based on the information contained in the token template.

In other embodiments, the generated token is a defective token.

BRIEF DESCRIPTION OF THE DRAWINGS

Similar reference numbers are used throughout the figures to reference like components and/or features.

DETAILED DESCRIPTION

The systems and methods discussed herein allow a user to define and generate arbitrary XML tokens for use in, for example, testing the ability of one or more components or applications to handle the generated tokens. These systems and methods allow users to define and generate defective tokens to determine how components or applications process the defective tokens. The use of defective tokens may enhance testing by creating unusual situations through the use of defective tokens. These unusual situations might occur very infrequently in a live network setting, thereby extending the time required for testing.

Users can define any type of token and can cause a token generator to create tokens that appear to have been created by any server in any domain or network. The systems and methods described herein also allow users to test systems and applications without actually transmitting data in a live network environment or communicating with a live authentication server. In this situation, the token generator may generate "good" tokens. After satisfactory testing, the system or application being tested may be coupled to a live network environment. Additionally, the described systems and methods are useful in verifying tokens that were generated by an authentication server.

As used herein, a defective token may also be referred to as an invalid token, a bad token, or an erroneous token. A particular defective token may contain any number of defects or irregularities. A defective token may be referred to as "partially defective" if a portion of the information contained in the token is valid while another portion of the information is invalid.

Particular examples discussed herein relate to the generation and distribution of XML tokens. However, the systems and methods discussed herein are applicable to any type of token or other data structure using any protocol or language. Further, the tokens discussed herein may be used in conjunction with any web service, device, or application in any operating environment.

Figure 1:
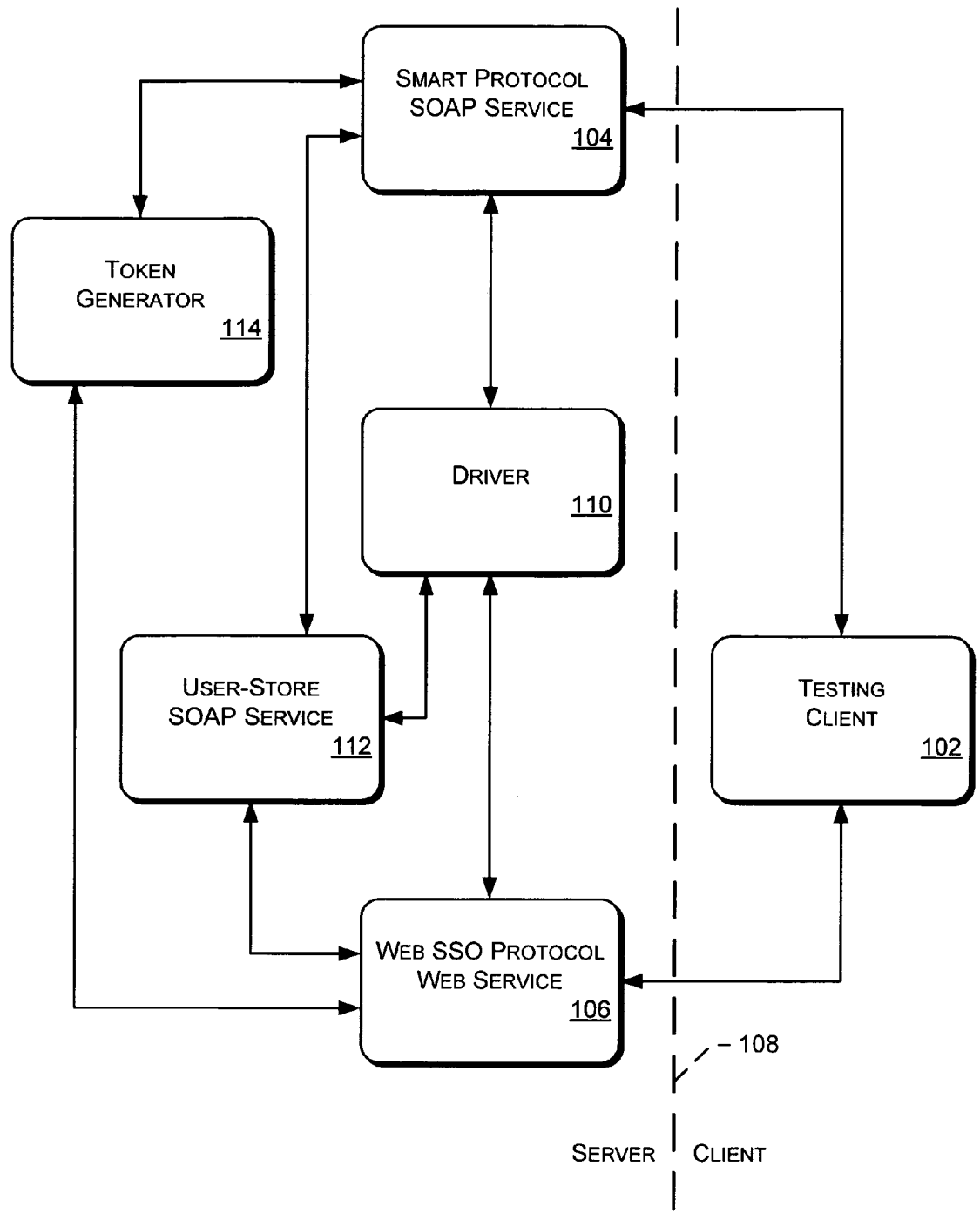
FIG. 1 illustrates an example system capable of generating and processing tokens as discussed herein.

FIG. 1 illustrates an example system capable of generating and processing tokens as discussed herein. A testing client 102 communicates with a smart protocol SOAP (Simple Object Access Protocol) service 104, which is also referred to as an "active requestor profile". Smart protocol SOAP service 104 emulates a federated token server for the smart client protocol and can make requests for tokens using, for example, a <RequestSecurityToken> SOAP request as described in the WS-Trust security specification. The WS-Trust security specification provides a framework for securely supporting various Web services. Smart protocol SOAP service 104 uses a token generator (discussed below) to generate various tokens, including both "good" tokens and "bad" tokens, and returns each token in a <RequestSecurityTokenResponse> SOAP response as described in the WS-Trust security specification.

Testing client 102 also communicates with a Web SSO (Single Sign-On) protocol Web service 106, which is also referred to as a "passive requestor profile". Web SSO protocol Web service 106 emulates a federated token server for the Web SSO protocol. Using this protocol, a user can browse to a login server that participates in federated login. That login server will redirect the user's browser to the Web SSO server, which will generate a token (e.g., using the XML token generator discussed below) in response to receipt of the user's username and password. The token will be posted (e.g., using the http "Post" instruction) to the originating page from which the user was redirected. The web page that wanted to authenticate the user then parses and verifies the signature of the token. After the token is verified, the user is permitted to access the desired resources.

A driver 110 is coupled to smart protocol SOAP service 104 and Web SSO protocol Web service 106. Driver 110 loads and configures the various services. A user-store SOAP service 112 is coupled to driver 110 as well as smart protocol SOAP service 104 and Web SSO protocol Web service 106. User-store SOAP service 112 provides a mechanism for storing and retrieving various user data. User-store SOAP service 112 includes a user-store access engine that parses and responds to service requests, such as requests for user credentials. Further, user-store SOAP service 112 includes a data storage component and an active directory interface that can be configured to be plugged into an active directory.

A token generator 114 is coupled to smart protocol SOAP service 104 and Web SSO protocol Web service 106. Token generator 114 receives information from a token template that contains information regarding a token to be generated by the token generator. This information includes, for example, the type of token, the token structure, and the token data. The token template is discussed in greater detail below.

Broken line 108 identifies a boundary between a client environment and a server environment. Broken line 108 also identifies a boundary across which other federation networks will communicate with the test network. In this example, testing client 102 is located in the client environment and the remaining components are located in the server environment. In one embodiment, the components located in the server environment are referred to collectively as a "test server". In an alternate embodiment, a real client may be used instead of test client 102. In this embodiment, the test server communicates with the client and with servers in other federated networks across the boundary identified by broken line 108, thereby allowing the test server to participate in federation.

Figure 2:
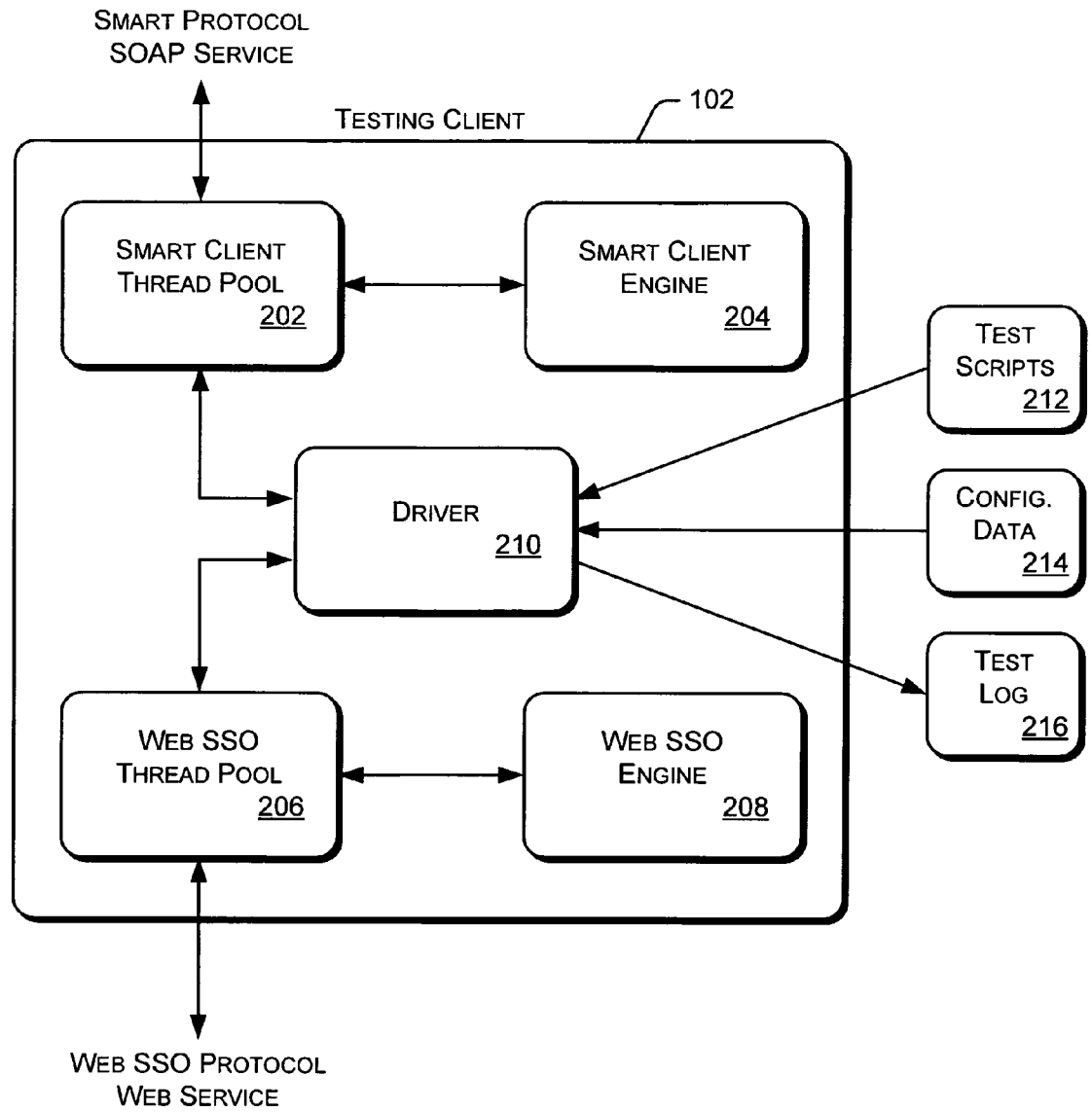
FIG. 2 is a block diagram of selected components of the testing client shown in FIG. 1.

FIG. 2 is a block diagram of selected components of testing client 102 shown in FIG. 1. A smart client thread pool 202 maintains a pool of threads used to make parallel requests to a smart client service and a Web SSO thread pool 206 maintains another pool of threads used to make parallel requests to a Web SSO service. A smart client engine 204 is coupled to smart client thread pool 202. Smart client engine 204 formats and generates requests by requesting threads from smart client thread pool 202. A Web SSO engine 208 is coupled to Web SSO thread pool 206. Web SSO engine 208 formats and generates requests by requesting threads from Web SSO thread pool 206.

Smart client thread pool 202 and Web SSO thread pool 206 are coupled to a driver 210. In one embodiment, driver 210 is an executable code sequence that enables test cases (enumerated in one or more test scripts 212) to be run using a test server or other device. Test scripts 212 contain instructions to the client regarding actions to be performed, such as: get an expired token for a specified user, navigate to a specified web service associated with a known federation server, and the like. The driver 210 is responsible for reading and storing configuration information 214, reading test scripts 212 and assigning the test scripts to threads to be processed. Configuration information 214 includes network configuration information and test configuration information. The results of executing test scripts 212 are stored in a test log 216.

In a particular embodiment, testing client 102 operates as a single, multi-threaded process with distinct thread pools 202, 206 for the smart client and the Web SSO client, which are all driven by the driver process 210. The driver process is responsible for reading and parsing configuration information and test scripts, as well as selecting a specific thread to service a specific case. Smart client cases and Web SSO client cases can be divided at the script file level for simplicity.

Token generator 114 shown in FIG. 1 is capable of generating any type of token, such as XML tokens, containing any data specified in a token template created by a user. The token template describes the types of tokens to be generated by token generator 114. For example, the token template may include information regarding a token's signature, associated origin server, or token structure. Token generator 114 can generate tokens that appear to have been generated by any server in any domain or network. This is useful in testing a system's handling of tokens generated by particular servers or originating in particular domains or networks. For example, various tokens can be generated and used in requests to determine network performance, perform stress testing on the network, and determine error handling performance by various servers or applications. Additionally, token generator 114 can apply various signature properties to tokens and can edit signature properties before computation as well as after computation. Editing signature properties after computation invalidates the signature.

Token generator 114 is also capable of generating invalid tokens. Invalid tokens may have one or more of the following: invalid token structure, invalid signature, or invalid parameters. Additionally, invalid tokens may be issued to an incorrect person, contain unknown issuers, contain long strings for certain parameters to cause buffer overruns, contain additional elements that a federation server cannot understand, etc. Token generator 114 can generate any number of arbitrary tokens, including any combination of valid and invalid tokens. Typically, token generator 114 returns one token in response to a user request for such token. The user request identifies a token template that identifies the token desired to be generated by the user. Token templates can be stored in a file or passed to token generator 114 as an input string. Token generator 114 is capable of generating tokens in different formats, such as SAML (Security Assertion Markup Language) or XRML (Extensible Rights Markup Language), in a data-driven manner that does not require code changes to change token format, token layout, or token data.

In a particular embodiment, the elements within the token are exposed via XPath, which makes the token easy to modify. XPath is an expression language that allows the processing of values conforming to a data model that provides a tree representation of XML documents as well as other data. XPath was developed by the World Wide Web Consortium (W3C). In this embodiment, tokens are signed using X.509 certificates. X.509 is currently an ITU (International Telecommunication Union) recommendation for defining digital certificates.

Figure 3:
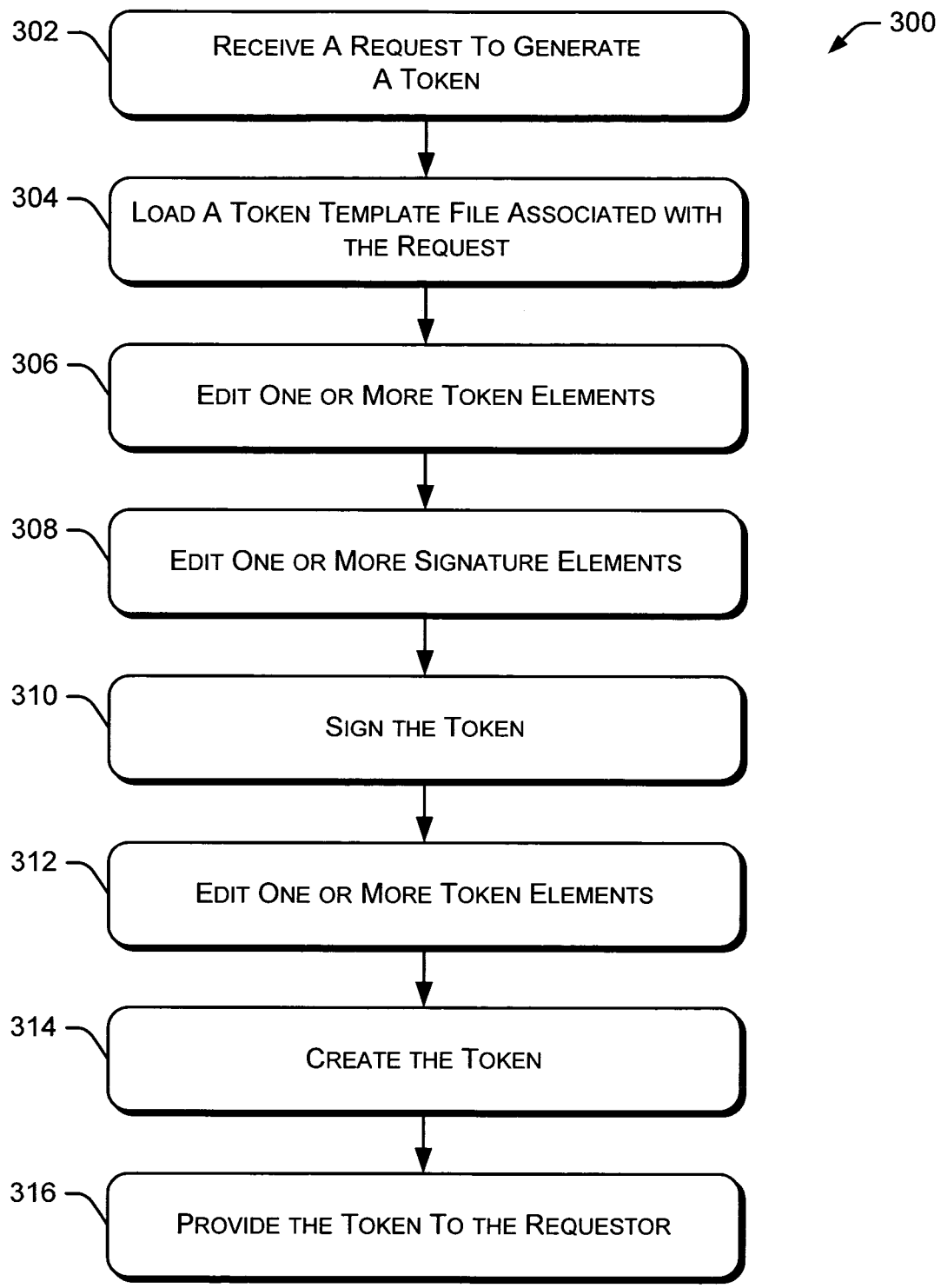
FIG. 3 is a flow diagram illustrating an embodiment of a procedure for generating a token.

FIG. 3 is a flow diagram illustrating an embodiment of a procedure 300 for generating a token. In one embodiment, procedure 300 is performed by a token generator. Initially, procedure 300 receives a request to generate a token (block 302). The request may be generated, for example, using a "GenerateNewToken( )" instruction. This instruction is a logical representation of one or more functions or operations provided by a token generator library. The request identifies a token template associated with the request. The procedure continues by loading the token template identified in the request (block 304). For example, the template may be loaded by performing a "LoadToken(TemplateFile)" instruction.

Procedure 300 continues by optionally editing one or more token elements (block 306). Such editing may be performed, for example, using a "EditToken(Token Elements)" instruction. Next, the procedure optionally edits one or more signature elements (block 308). For example, a "EditSignature (SignatureElement)" instruction can be executed. Procedure 300 then signs the token (block 310), using an instruction such as "SignToken(X.509Certificate)".

The procedure then performs additional optional editing of one or more token elements (block 312). This additional editing of the token elements is performed after signing the token, as identified by block 310. Calculating a signature on a token includes performing one or more operations on the contents of the token. For example, the operations may generate a unique value (such as a hash value) that represents the contents of the token. The signature is calculated by performing a cryptographic signature operation on the unique value. Thus, any editing that occurs before the signature is calculated is accounted for in the unique value. Any changes made to the token body or the signature element after the signature is calculated will invalidate the signature.

Procedure 300 then creates a token (block 314), for example by executing a "GetToken( )" instruction. The created token is then provided to the requestor (block 316). In one embodiment, the token is provided to the requestor by executing a "ReturnTokenToClient( )" instruction. The token is returned to the requester (e.g., the client). In certain situations (e.g., a passive requestor), the token is returned with instructions regarding how to handle the token. The token may be distributed to one or more other servers by the requesting client. In other embodiments, the tokens are distributed to a network or server, as specified in the token template.

Figure 4:
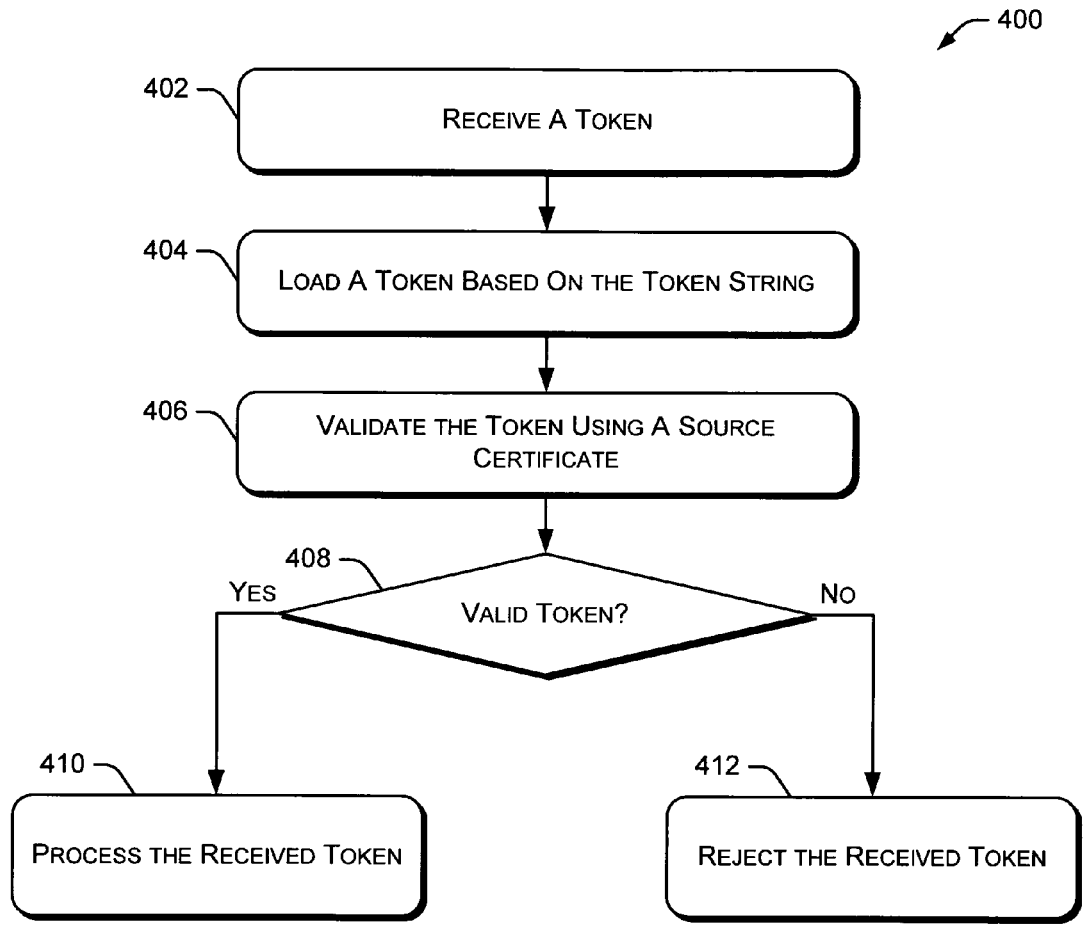
FIG. 4 is a flow diagram illustrating an embodiment of a procedure for validating a token.

FIG. 4 is a flow diagram illustrating an embodiment of a procedure 400 for validating a token. In one embodiment, procedure 400 is performed by a token service or token processing system. For example, procedure 400 may be performed on tokens received from one or more federated servers. Initially, procedure 400 receives a token (block 402). The received token was generated, for example, by performing a "GetToken( )" instruction. Alternatively, the received token may have been generated by a federation server based on user credentials.

Next, procedure 400 loads a token based on the token string (block 404). The token string contains a token or references a file containing a token. A token can be loaded, for example, using a "LoadToken(TokenString)" instruction. The procedure continues by validating the token using a source certificate (block 406). Validating the token includes, for example, executing a "ValidateToken(CertificateSource)" instruction. If the token is valid (as determined at block 408), procedure 400 branches to block 410, which processes the received token. If the token is not valid, then the token is rejected (block 412). Alternatively, if the token is not valid, the token is simply discarded. In a particular embodiment, the results of the validation of the token are reported by executing a "ReturnStatus( )" instruction.

The following represents an example token template.

```
<saml:Assertion
xmlns:saml="urn:oasis:names:tc:SAML:1.0:assertion"
MajorVersion="1" MinorVersion="0" AssertionID="af30e160-d740-
43a2-b3eb-e9abd2f0d414" Issuer="testbridge.com"
IssueInstant="2004-02-25T00:48:01">
        <saml:Conditions NotBefore="2004-02-25T00:48:01"
    NotAfter="2004-02-25T01:48:01">
                <saml:AudienceRestrictionCondition>
<saml:Audience>http://testbridge/TbPartner/TbPartner.aspx</saml:A
udience>
                </saml:AudienceRestrictionCondition>
        </saml:Conditions>
        <saml:AuthenticationStatement AuthenticationInstant="2004-02-
    25T00:48:01" AuthenticationMethod="ps:password">
        </saml:AuthenticationStatement>
        <saml:Subject>
<saml:NameIdentifier>TestUser@testbridge.com</saml:NameIdentifier
>
            <saml:SubjectConfirmation>
<ConfirmationMethod>http://schemas.microsoft.com/trustbridge/prot
ocol#1
            </ConfirmationMethod>
            </saml:SubjectConfirmation>
        </saml:Subject>
        <Signature xmlns="http://www.w3.org/2000/09/xmldsig#">
            <SignedInfo>
                <CanonicalizationMethod
Algorithm="http://www.w3.org/2001/10/xml-exc-c14n#" />
                <SignatureMethod
Algorithm="http://www.w3.org/2000/09/xmldsig#rsa-sha1" />
                <Reference URI="">
                    <Transforms>
                        <Transform Algorithm="http://www.w3.org/2001/10/xml-
exc-c14n#" />
                        <Transform
Algorithm="http://www.w3.org/2000/09/xmldsig#enveloped-signature"
/>
                    </Transforms>
                    <DigestMethod
Algorithm="http://www.w3.org/2000/09/xmldsig#sha1" />
```

-continued

```
            <DigestValue>HBBbvbjnbOUoB/zRk+K2ShOutAM=</DigestValue>
        </Reference>
    </SignedInfo>
    <SignatureValue>
JRiPXZZhN3HpxWNmVkDjDT+qOxKGPKPLDnrnXL+9q93Bny4Sy94TqkjGvmRaBavtn
1NTZv4vlk5qZScOch2MnENBUorSk+XEocch8Hkha+1aNiR+qP6KIgCLAPsKY8+2c
03ea4Nl1N/yMCUSERIzCd2gP7rl5uNpQRiCsHtnEQ=
    </SignatureValue>
    <KeyInfo>
        <X509Data>
<X509SKI>3416d80413dfebcb12946fe0bd1320040c8f20b1</X509SKI>
        </X509Data>
        <KeyName>Testbridge Login Server</KeyName>
    </KeyInfo>
</Signature>
</saml:Assertion>
```

The above token template identifies various information about the tokens to be generated based on the token template. For example, the portion of the token template beginning "<sam1:Subject>" identifies the person with which the template is associated. Additionally, the portion: "Signature xmlns="http://www.w3.org/2000/09/xmldsig#"">" Identifies an XML signature associated with the generated token(s).

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a request to generate a test token that comprises known defects for use in determining how components or applications process a defective token, wherein the request identifies a token template that contains information regarding the test token to generate;
   identifying the information contained in the token template; and
   generating the test token based on the information contained in the token template;
   distributing a plurality of test tokens in a network environment, wherein the test tokens comprise defects for use in determining how the components or the applications process defective tokens; and
   monitoring network activity in response to distributing the plurality of test tokens.

2. A method as recited in claim 1 wherein the token template contains information regarding a type of token to generate.

3. A method as recited in claim 1 wherein the token template contains information regarding a token structure to generate.

4. A method as recited in claim 1 wherein the token template contains information regarding data to include in the test token.

5. A method as recited in claim 1 wherein the test token is an XML token.

6. A method as recited in claim 1 wherein generating a test token includes generating a token that appears to have been generated by a particular server.

7. A method as recited in claim 1 wherein the test token comprises at least some valid information and at least some defective information that is invalid.

8. A method as recited in claim 7 wherein the defective information comprises an invalid token structure.

9. A method as recited in claim 7 wherein the defective information comprises an invalid signature.

10. A method as recited in claim 1 wherein the token template further contains information regarding the signature of the tokens.

11. A method as recited in claim 1 wherein the token template further contains information regarding a server by which the tokens appear to be generated.

12. One or more computer-readable memories containing a computer program that is executable by a processor to perform the method recited in claim 1.

13. A method comprising:
   creating a token template that comprises information used to create an invalid token for use in determining how components or applications in a network environment process an invalid token;
   initiating a request for a test token, wherein the request identifies the token template to create the invalid token;
   creating the invalid token;
   distributing the invalid token in the network environment; and
   monitoring network activity in response to distribution of the invalid token in the network environment to be determine how the components or applications in the network environment process the invalid token.

14. A method as recited in claim 13 wherein the information contained in the token template includes token format information.

15. A method as recited in claim 13 wherein the information contained in the token template includes token signature information.

16. A method as recited in claim 13 wherein the invalid token has an invalid token format.

17. A method as recited in claim 13 wherein the invalid token has an invalid signature.

18. One or more computer-readable memories containing a computer program that is executable by a processor to perform the method recited in claim 13.

19. A method comprising:
   receiving a request to generate an invalid token, which can be used to determining how components or applications in a network environment process the invalid token, wherein the request the request identifies a token template that contains information regarding content to include in the invalid token;
   identifying the information contained in the token template;
   generating the invalid token based on the information contained in the token template;

distributing the invalid token in the network environment; and monitoring network activity in response to distributing the invalid token to determining how the components or applications in a network environment process invalid token.

20. A method as recited in claim 19 wherein the invalid token has an invalid token format.

21. A method as recited in claim 19 wherein the invalid token has an invalid token format and an invalid signature.

22. A method as recited in claim 19 wherein the invalid token is generated such that it appears to have originated at a particular server in a particular domain.

23. One or more computer-readable memories containing a computer program that is executable by a processor to perform the method recited in claim 19.

24. One or more computer-readable media having stored thereon a computer program that, when executed by one or more processors, causes the one or more processors to:

receive a request to generate a token that comprises known defects for use in determining how components or applications process a defective token, wherein the request identifies a token template that contains information to be included in the token such that the token appears to be generated by a particular server;

identify the information contained in the token template; and generate the token that comprises known defects based on the information contained in the token template;

distributing a plurality of test tokens in a network environment, wherein the test tokens comprise defects for use in determining how the components or the applications process defective tokens; and monitoring network activity in response to distributing the plurality of test tokens.

25. One or more computer-readable media as recited in claim 24 wherein the defects comprise an invalid token structure.

26. An apparatus comprising:

a memory device to store a token template that comprises information to be included in a test token that is at least partially defective and for use in determining how components or applications process an at least partially defective token;

a token generator coupled to the memory device, the token generator to create the test token that is at least partially defective based on data contained in the token template;

a distributor to distribute a plurality of test tokens in a network environment, wherein the test tokens comprise defects for use in determining how the components or the applications process defective tokens; and a monitor to monitor network activity in response to distributing the plurality of test tokens.

27. An apparatus as recited in claim 26 wherein the processor is further configured to create a test token that appears to have been created by a particular server.

28. An apparatus as recited in claim 26 wherein the token template stored in the memory device includes token signature information.

29. An apparatus as recited in claim 26 wherein the token template stored in the memory device includes token structure information.

30. An apparatus as recited in claim 26 wherein the token template stored in the memory device includes token structure information and token signature information.

* * * * *